E. A. AND J. V. CUNNIFF.
REPLENISHING LOOM.
APPLICATION FILED DEC. 12, 1912.
1,375,036.
Patented Apr. 19, 1921.
11 SHEETS—SHEET 3.
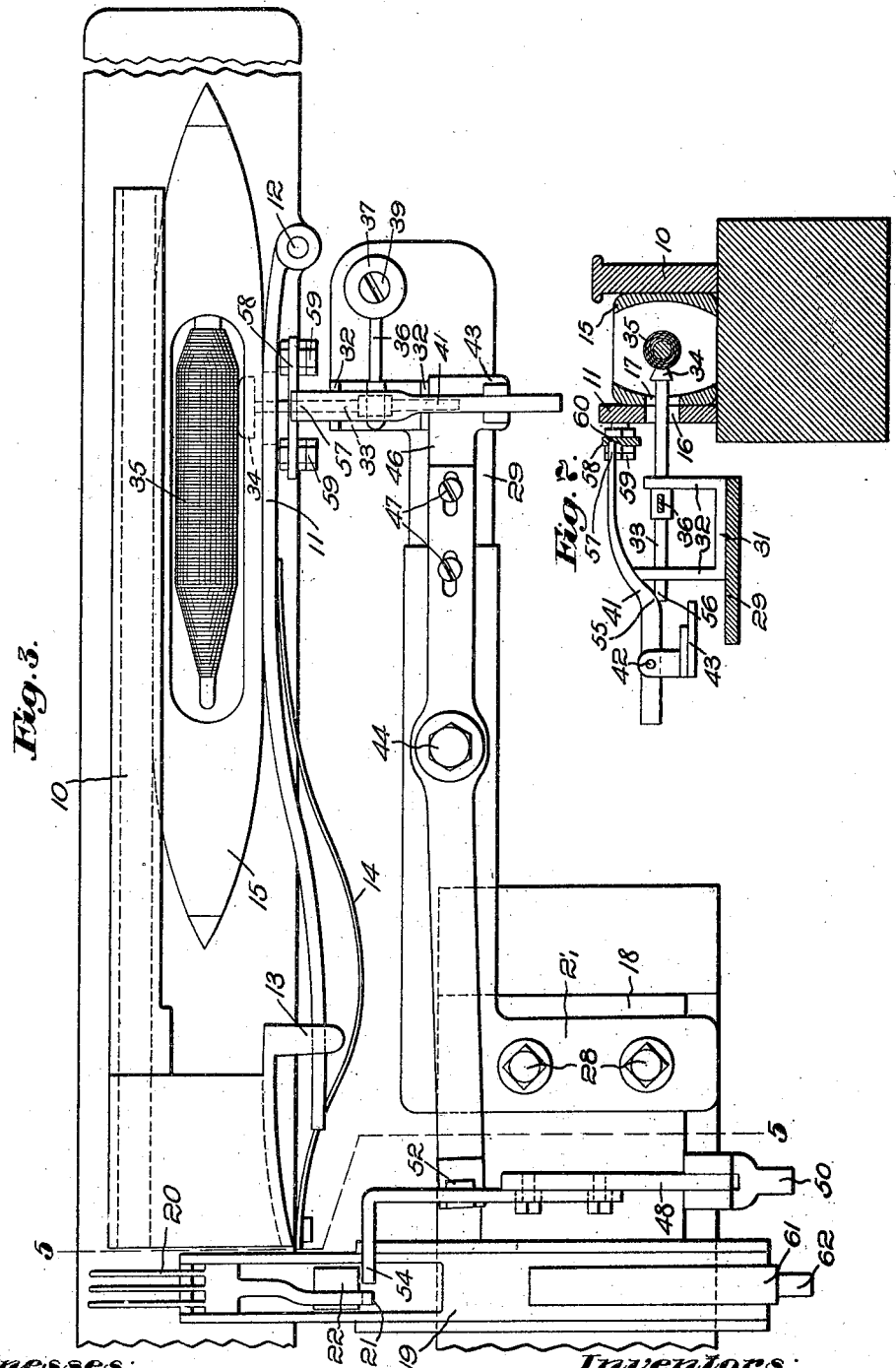

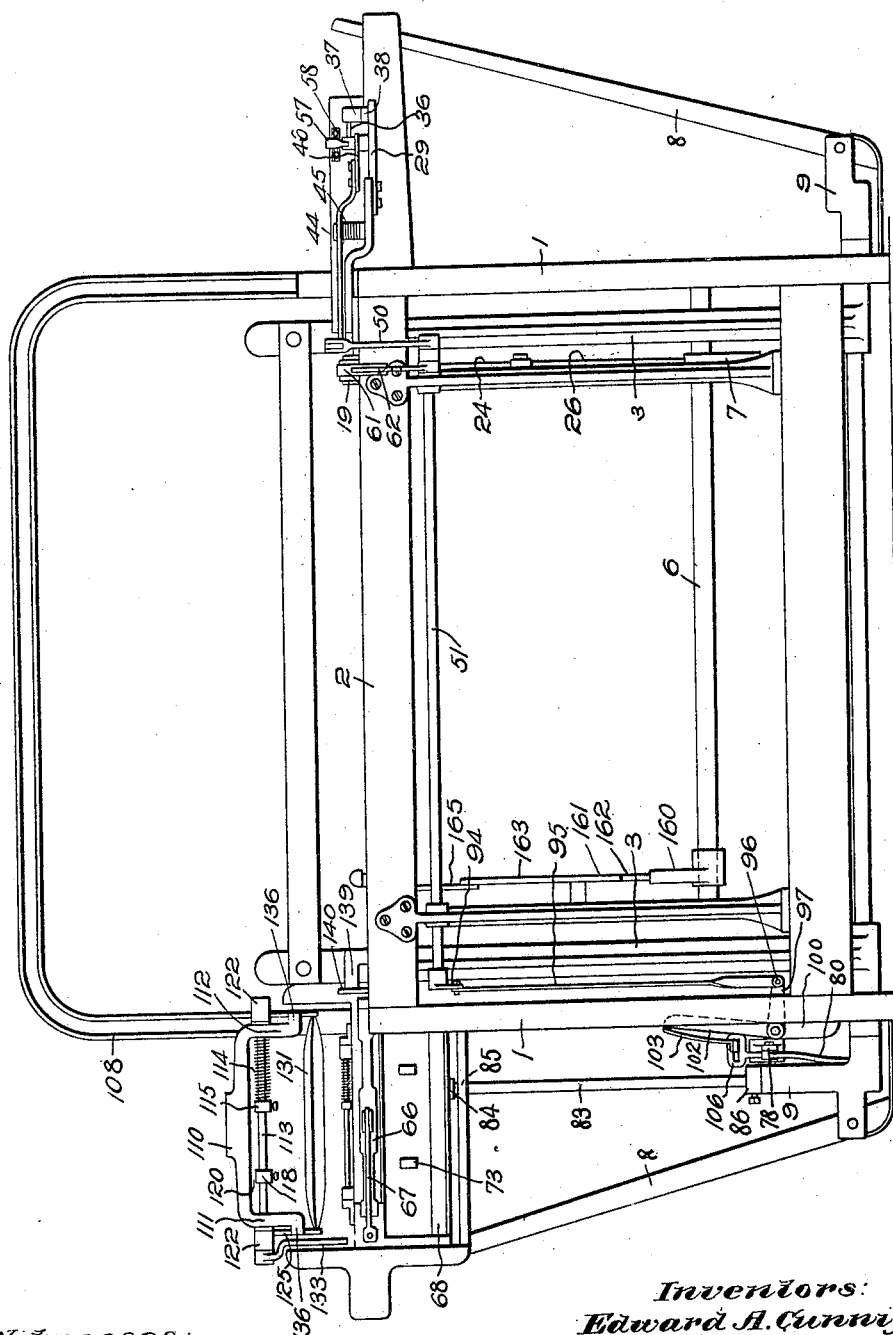

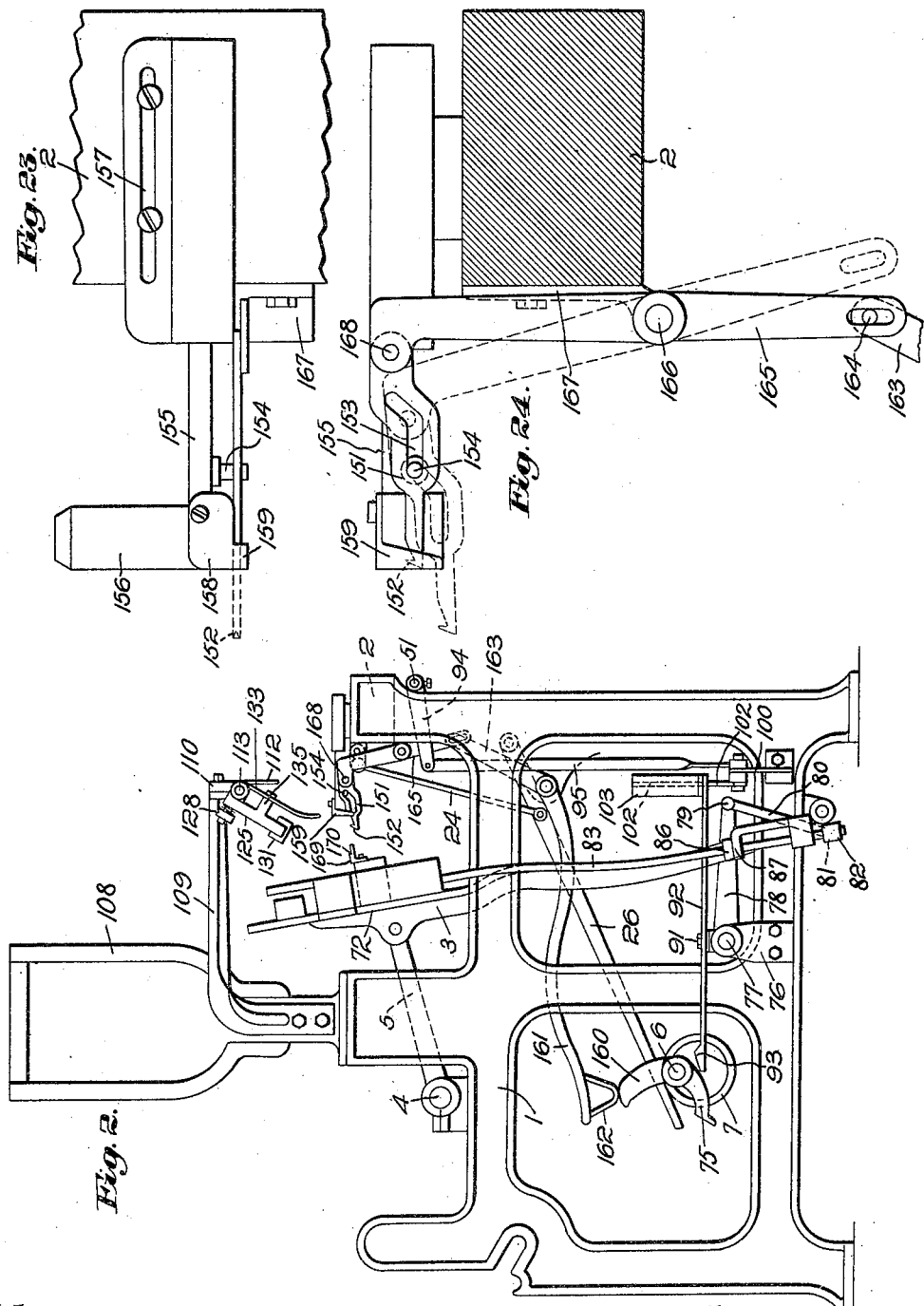

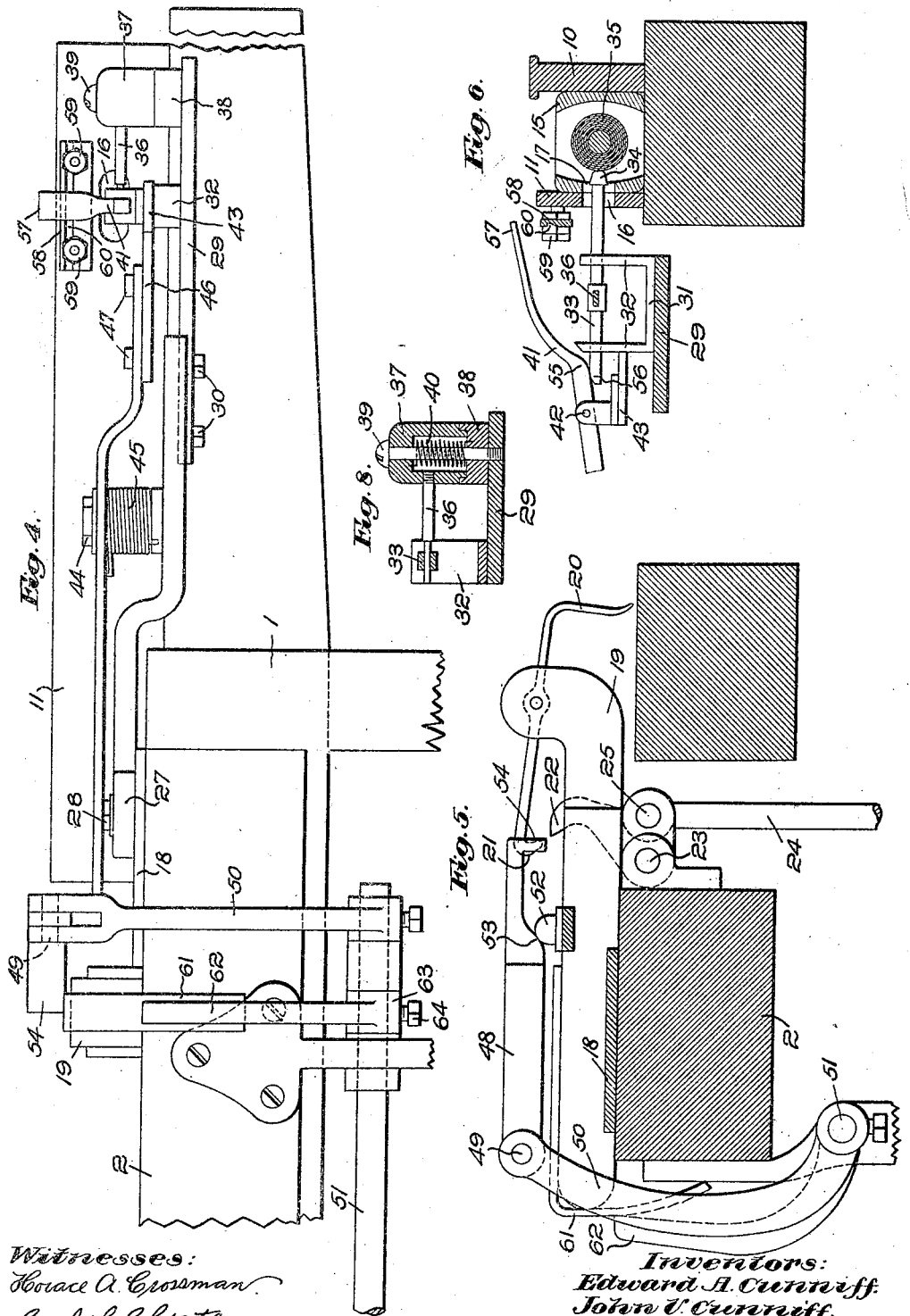

E. A. AND J. V. CUNNIFF.
REPLENISHING LOOM.
APPLICATION FILED DEC. 12, 1912.

1,375,036.

Patented Apr. 19, 1921.
11 SHEETS—SHEET 5.

Witnesses:
Horace A. Crossman
Carl L. Choate.

Inventors:
Edward A. Cunniff
John V. Cunniff
by Emery, Booth, Janney & Varney
Attys

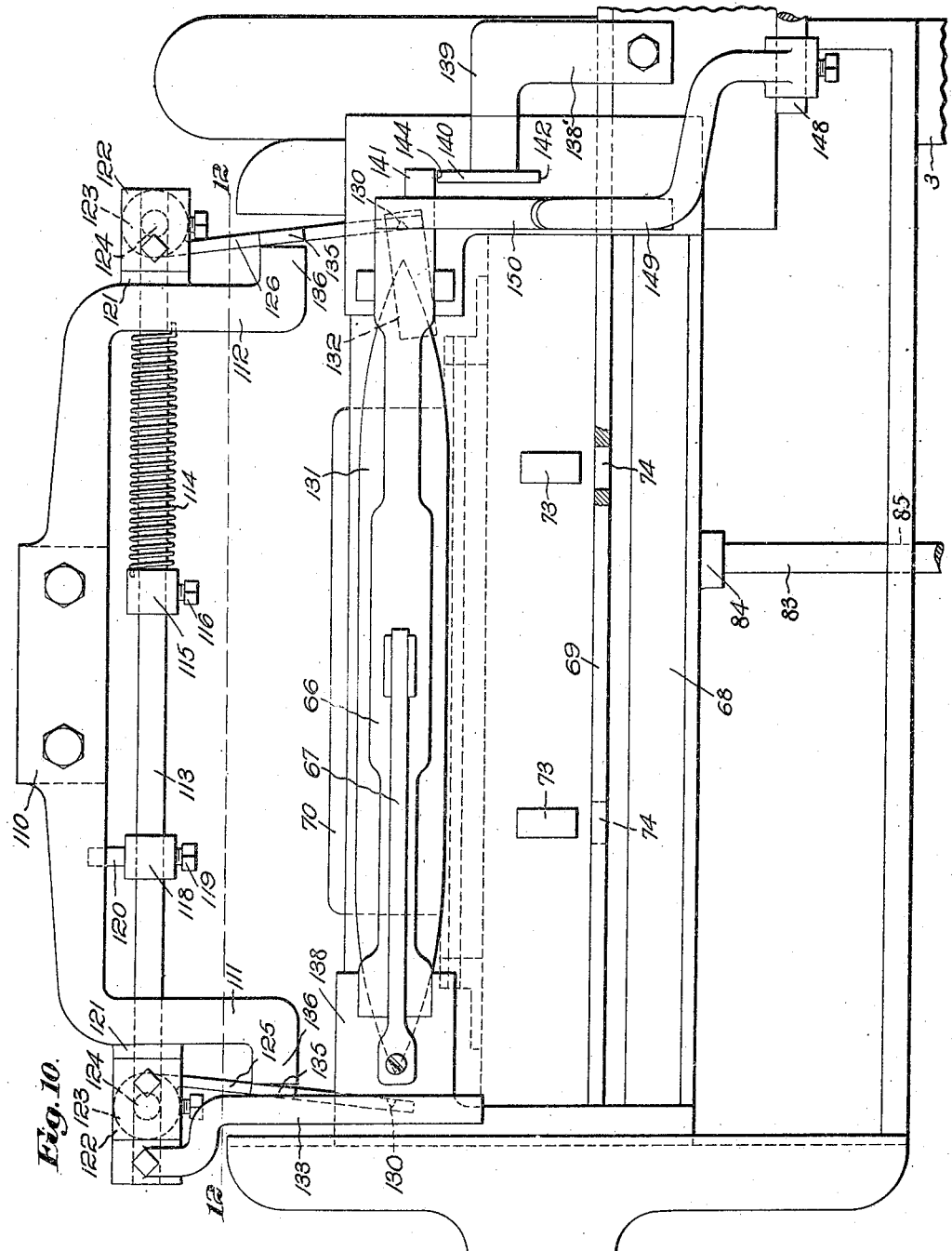

E. A. AND J. V. CUNNIFF.
REPLENISHING LOOM.
APPLICATION FILED DEC. 12, 1912.
1,375,036.
Patented Apr. 19, 1921.
11 SHEETS—SHEET 7.
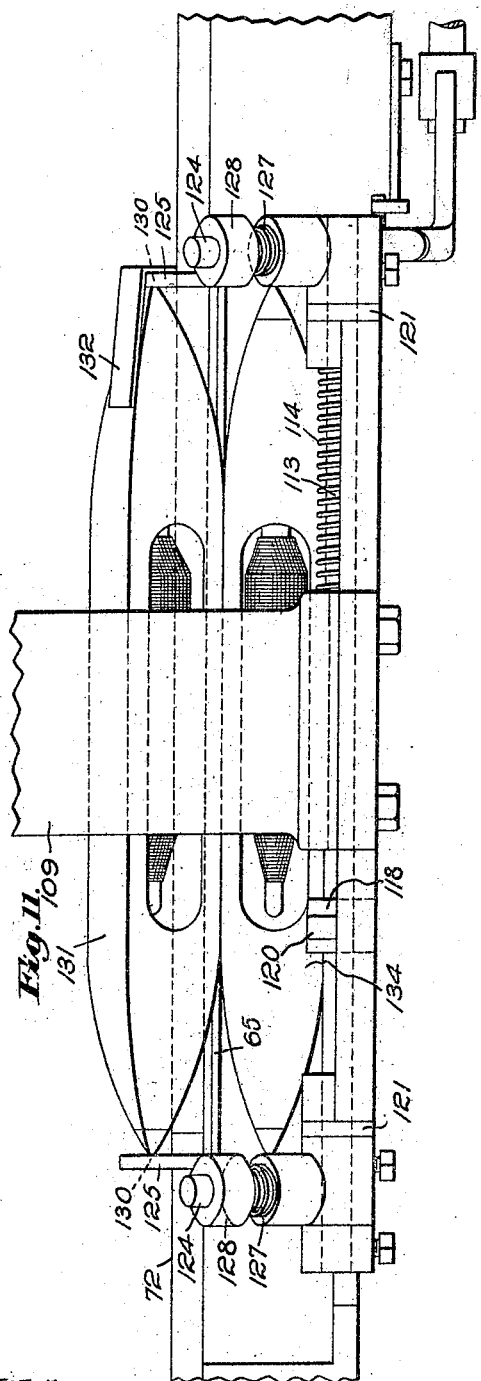
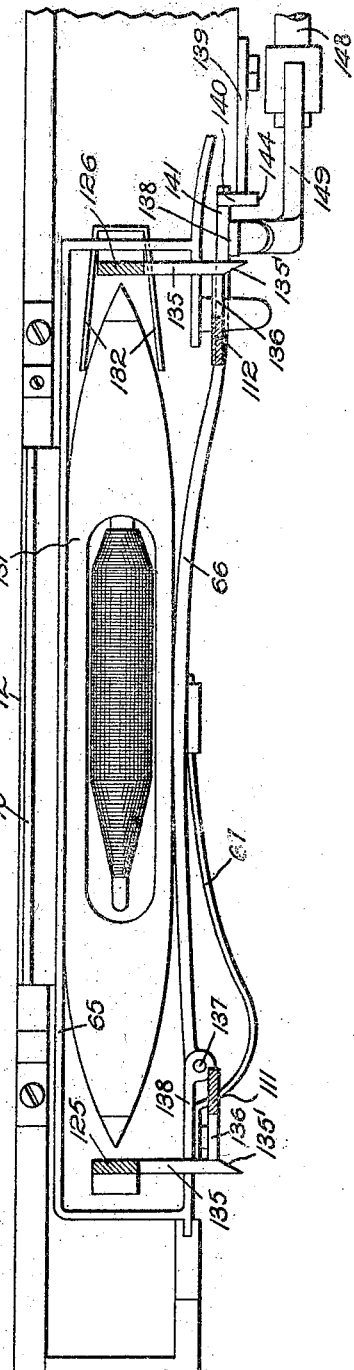

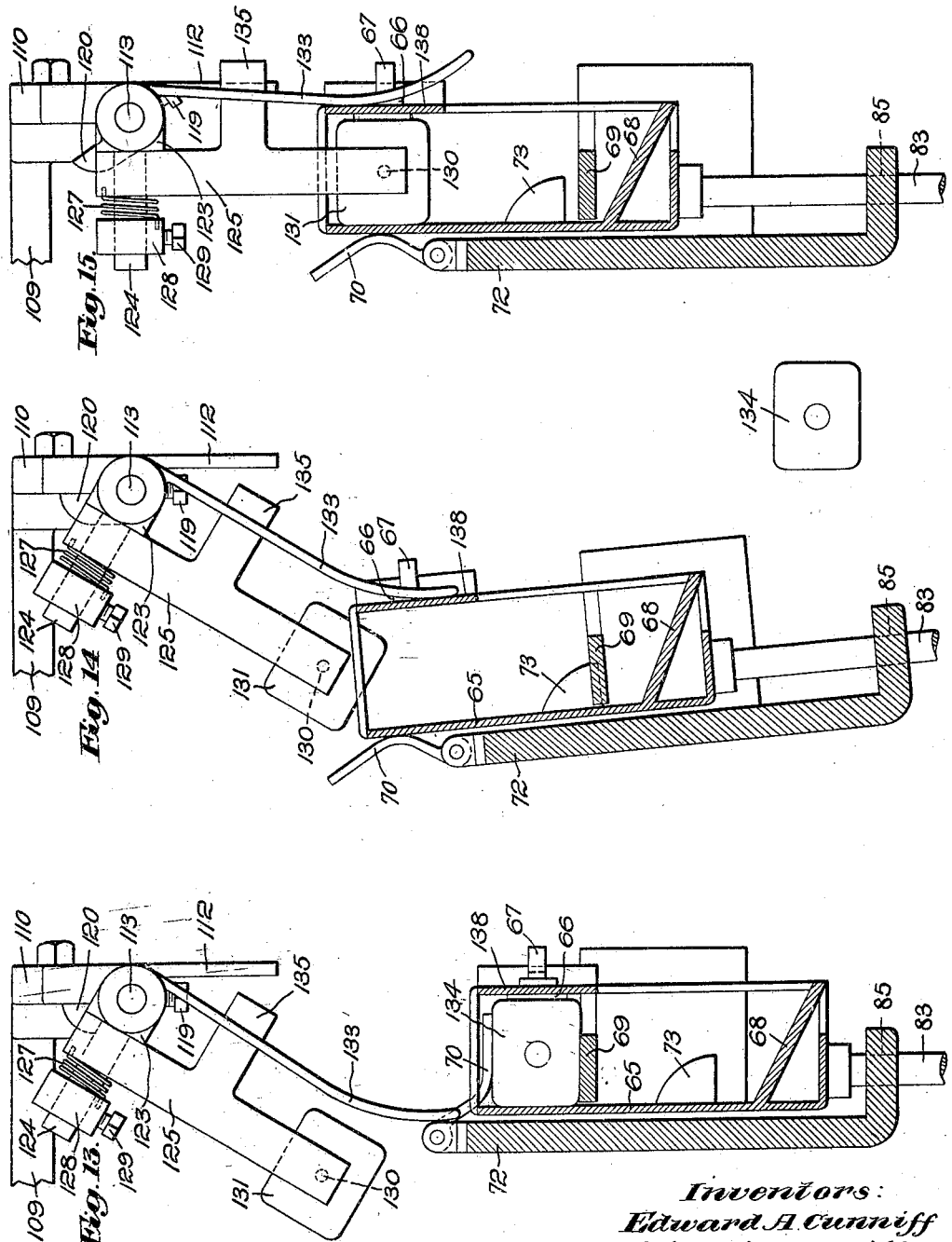

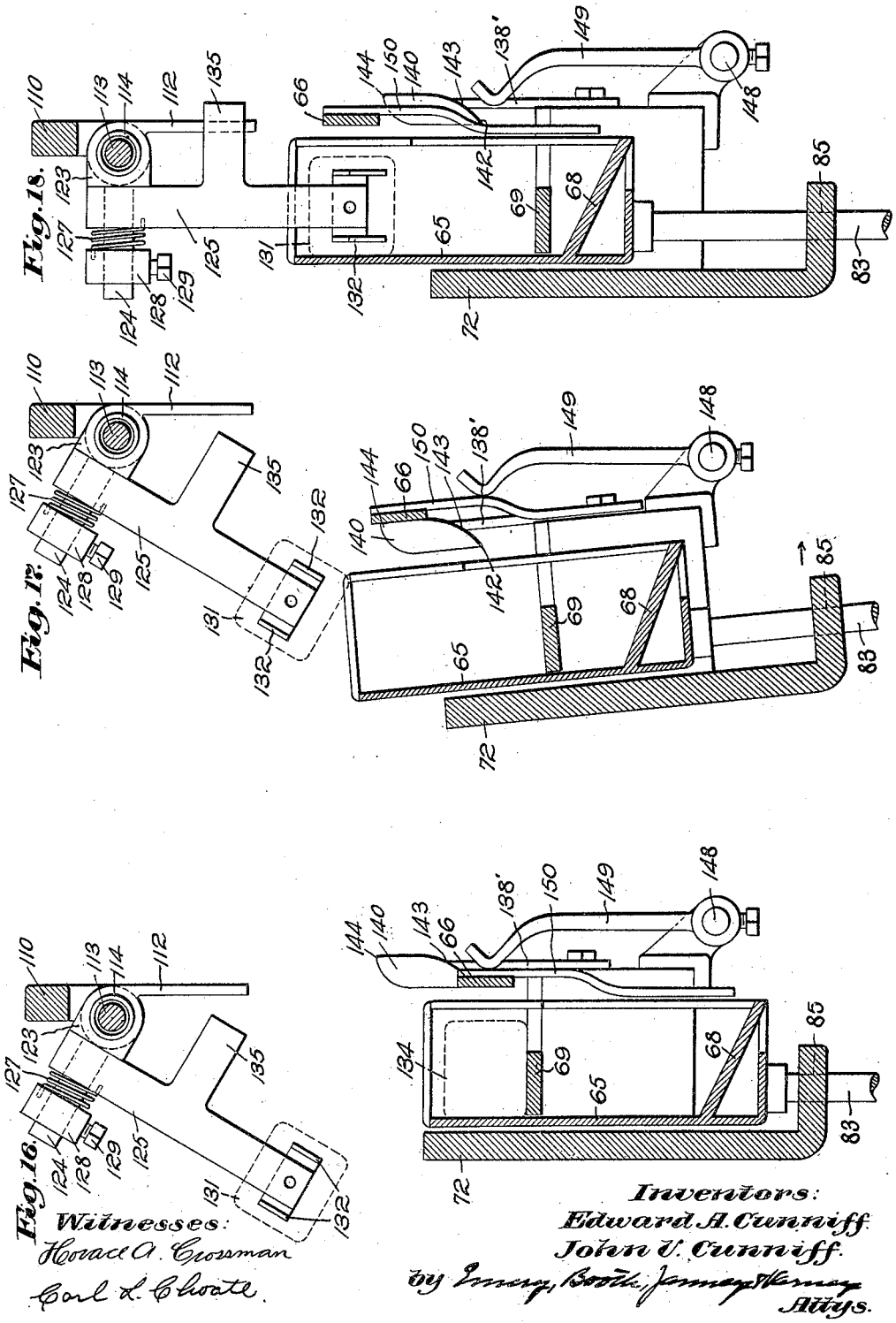

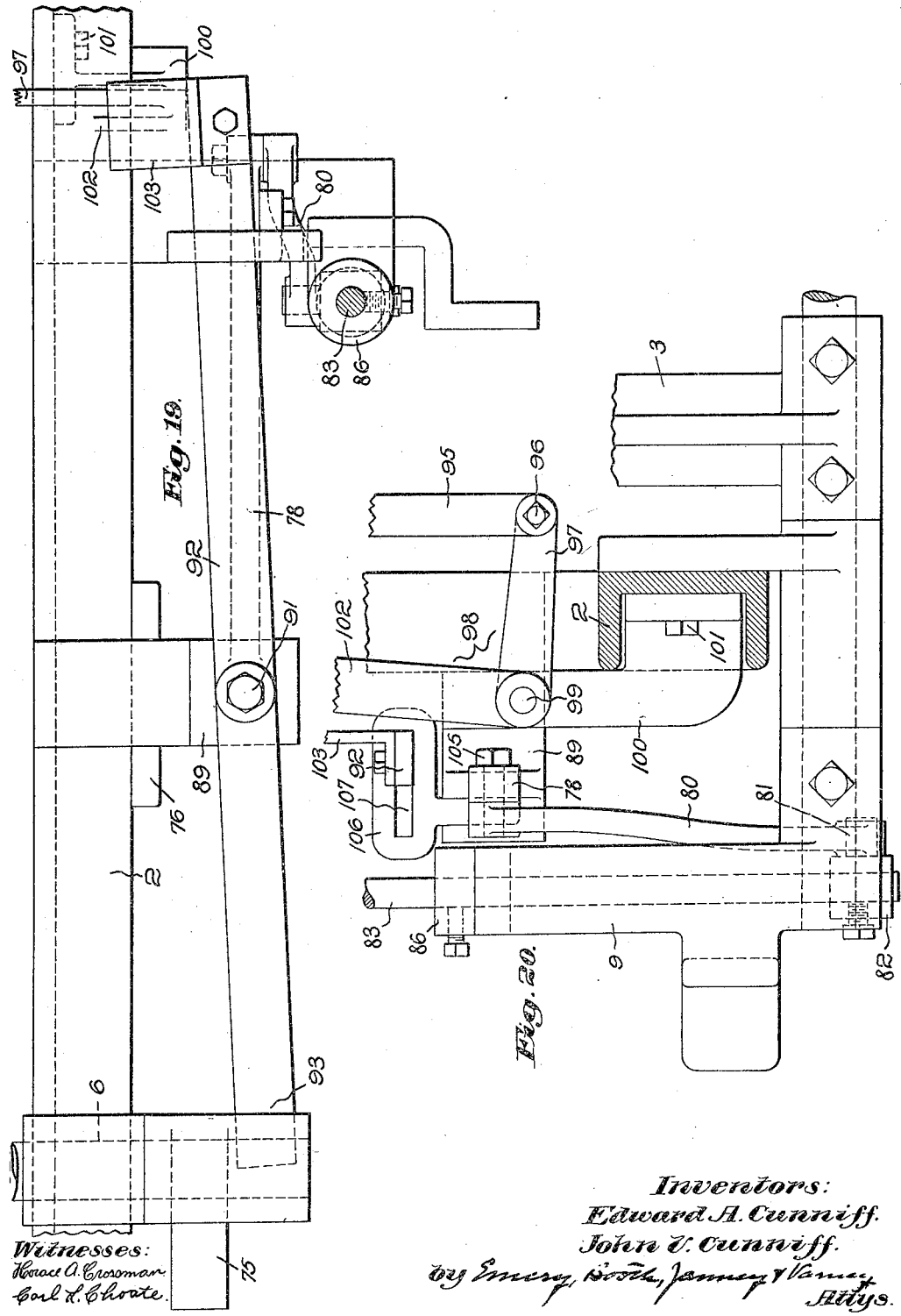

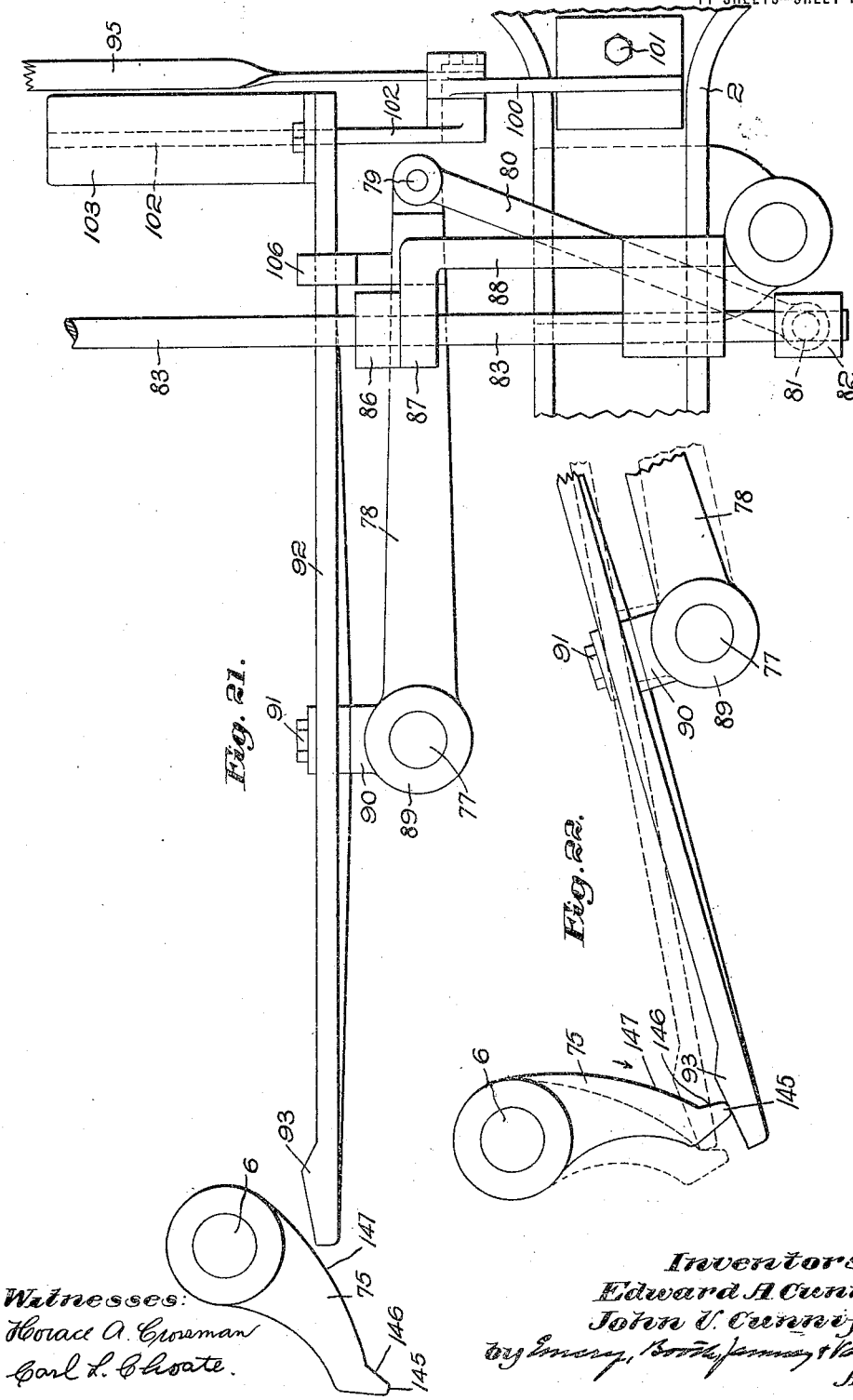

UNITED STATES PATENT OFFICE.

EDWARD A. CUNNIFF, OF NEW BEDFORD, AND JOHN V. CUNNIFF, OF FALL RIVER, MASSACHUSETTS, ASSIGNORS TO JAMES K. LANNING, OF BOSTON, MASSACHUSETTS.

REPLENISHING-LOOM.

1,375,036.

Specification of Letters Patent.   Patented Apr. 19, 1921.

Application filed December 12, 1912.   Serial No. 736,284.

*To all whom it may concern:*

Be it known that we, EDWARD A. CUNNIFF and JOHN V. CUNNIFF, citizens of the United States, and residents, respectively, of New Bedford and Fall River, in the county of Bristol and State of Massachusetts, have invented an Improvement in Replenishing-Looms, of which the following description, in connection with the accompanying drawings, is a specification, like characters on the drawings representing like parts.

This invention relates to replenishing looms, and particularly to looms wherein the running shuttle is ejected upon substantial exhaustion of the filling.

In order that the principle of the invention may be readily understood, a single embodiment thereof is disclosed in the accompanying drawings, wherein—

Figure 1 is a front elevation of a single box loom having the invention applied thereto;

Fig. 2 is a left hand end elevation of the construction shown in Fig. 1;

Fig. 3 is a plan view of the breast beam, lay and associated parts at the indicating side of the loom;

Fig. 4 is a front elevation of the construction shown in Fig. 3;

Fig. 5 is a section upon the line 5—5 of Fig. 3;

Fig. 6 is a transverse section taken through the shuttle box, the lay and associated parts and representing the action of the filling feeler during the normal running of the loom;

Fig. 7 is a view similar to Fig. 6, but representing the action of the filling feeler and associated parts upon substantial exhaustion of the filling;

Fig. 8 is a sectional detail of the filling feeler and spring actuating means therefor;

Fig. 10 is a view similar to Fig. 9, but representing the replenishing shuttle as inserted upon ejection of the running shuttle;

Fig. 11 is a plan view of the construction shown in Fig. 9;

Fig. 12 is a longitudinal section on the line 12—12 of Fig. 10;

Figs. 13, 14 and 15 are vertical sections upon the line 13—13 of Fig. 9, and representing different positions of the parts prior to and during the shuttle replenishing operation;

Figure 9:
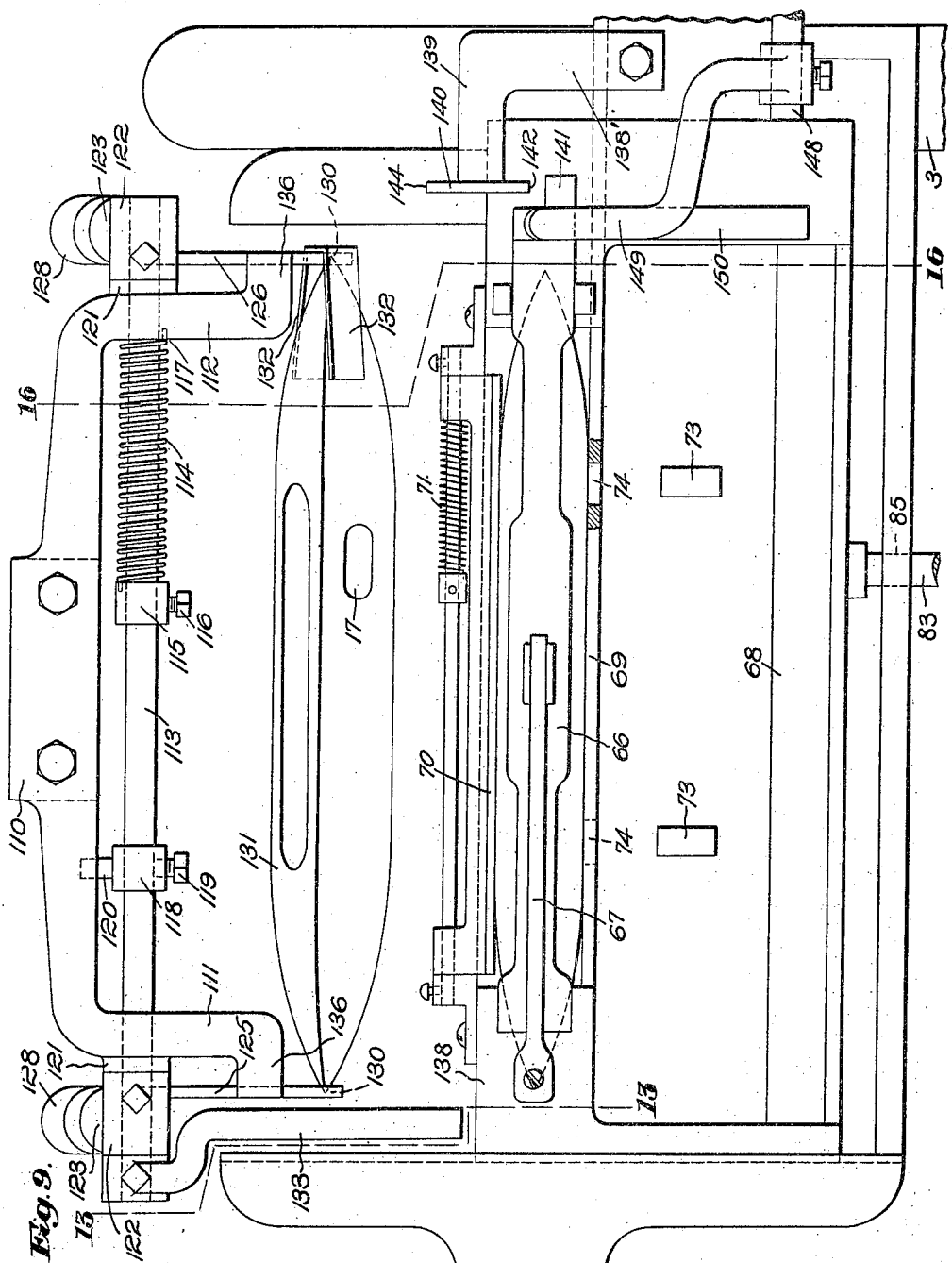
Fig. 9 is a front elevation of a portion of the shuttle replenishing mechanism, representing the shuttle box in running position.

Figs. 16, 17 and 18 are views respectively corresponding to Figs. 13, 14 and 15, but taken upon the line 16—16 of Fig. 9;

Fig. 19 is a plan view of a portion of the mechanism for lifting the shuttle box for shuttle replenishment;

Fig. 20 is an end elevation of the construction shown in Fig. 19 looking toward the left in said figure;

Fig. 21 is a side elevation of the construction shown in Fig. 19;

Fig. 22 is a detail of the cam and cam lever represented in Fig. 21, but showing a different position of said parts;

Fig. 23 is a detail in plan showing the thread parter mechanism; and

Fig. 24 is a detail in side elevation and transverse section of the construction shown in Fig. 23.

The purpose of the invention is to replenish the loom preferably upon substantial exhaustion of the filling, that is, upon exhaustion to a predetermined extent. If desired, replenishment may also occur upon weft failure. The replenishment is effected by ejecting the running shuttle from the loom and substituting the spare shuttle, although, regarding those aspects of the invention involving the use of the intermittently acting thread parter or the use of the secondary feeler, or both, the invention is not limited to shuttle replenishing, as hereinafter distinctly set forth in the claims. While the invention is not limited to the type of loom herein shown, it is peculiarly serviceable for application to a loom having a single shuttle box at each side; in other words, it is peculiarly adapted to a plain loom operating with a single color of weft.

In the simplest aspect of the invention, such a loom is equipped with means for supporting a single extra or spare shuttle, which, when the weft is substantially exhausted is automatically inserted in the shuttle box taking the place of the running shuttle which has just been ejected from the loom upon substantial exhaustion of its filling.

Referring more particularly to the drawings and first to Figs. 1 and 2 thereof, the end frames of the loom are represented at 1—1, the breast beam at 2, the lay at 3, the crank shaft at 4, the connecting rod between the crank shaft and lay at 5, the cam shaft at 6, the weft cam thereon at 7, the picker sticks at 8 and the picker stick brackets at 9. These parts may be and preferably are the usual type or construction.

Inasmuch as preferably the spare or extra shuttle is inserted for weft replenishment upon substantial exhaustion of the filling, there will first be described one form of filling feeler that may and preferably is employed as a coöperating portion of the weft replenishing mechanism, it being understood that any other suitable form of filling feeler may be utilized. Said filling feeler is not, however, specifically claimed in this application, but is specifically claimed in our copending application filed on even date herewith, Serial No. 736,285.

Referring first to Figs. 4 to 8 inclusive, upon the left hand end of the lay 3, there is provided a shuttle box back 10 and a shuttle binder 11, the latter being pivoted at 12 upon the lay.

A guide 13 is provided for the free end of the shuttle binder, and a shuttle binder spring 14 preferably of usual construction is also employed. The shuttle is indicated at 15. The shuttle binder 11 is provided with an opening 16 for the filling feeler, to be hereinafter described, and the shuttle itself is provided with an opening 17 in its lateral wall for the same purpose. Inasmuch as the shuttle replenishment occurs at the opposite side of the loom from that represented in Figs. 3 and 4, the binder and shuttle box at the said right hand side of the loom may be and preferably are of usual construction, excepting for the slot 16 in the binder 11.

Positioned flatwise upon the breast beam 2 is a guide 18 for the weft fork slide 19, the latter having mounted thereon a tilting weft fork 20 preferably of usual construction. Adapted to co-act with the inner hooked end 21 of the weft fork is a pawl 22 pivoted at 23 upon the breast beam and adapted to be swung upon its pivot by a rod 24 pivoted thereto at 25 and operatively connected as shown in Fig. 2 to the weft hammer 26. The said weft hammer 26 is operated in the usual manner by the weft cam 7 upon the cam shaft 6. In this form of the invention, there is employed an extension or bracket to support certain of the operating parts of the mechanism directly associated with the feeler mechanism. Herein there is represented an angled bracket 27 secured to the upper face of the breast beam by bolts 28 passing through said bracket and through the guide for the weft fork slide, thereby securing said parts to the breast beam. The said bracket 27 is represented in Figs. 3 and 4 as adjustable or extensible, it, for that purpose, being provided with an extensible piece 29 secured to the under face of the main bracket piece by bolts 30 passing through slots in said parts, so as to permit longitudinal adjustment. In this manner, the attachment may be applied to various sizes or forms of looms.

Upon the outer end of the bracket 27 is mounted a standard or bracket 31 having uprights 32 provided with alined bearing openings, wherein the feeler 33 is adapted to slide transversely of the shuttle. This filling feeler is provided with a head 34, which passes through the opening 16 of the binder and the corresponding opening 17 in the shuttle wall and engages the filling 35 upon the bobbin or other weft carrier at a suitable point, preferably at or near the base thereof. The filling feeler 33 is normally held against the filling in any suitable manner. For that purpose, there is herein represented, as shown in Fig. 8, an arm 36 extending transversely of the feeler and suitably secured thereto at its outer end. The said arm 36 is threaded into a cap or socket 37 mounted upon a base 38, the said socket and base being secured to the bracket extension 29 by a screw 39 passing axially through the socket. Surrounding the screw 39 and attached at its ends to the socket and base respectively is a coiled spring 40, the winding of which is such as to project the feeler 33 outwardly toward the shuttle. Undue outward movement of the feeler 33 is prevented by engagement of the arm 36 with one of the uprights 32, as represented in Fig. 7.

Coöperating with the feeler 33, there is herein shown as preferably provided a so-called secondary fork or secondary feeler. This member is indicated at 41 in Figs. 6 and 7, as a light lever pivoted at 42 and partaking somewhat of the form of an ordinary weft fork. This secondary fork or feeler removes all strain of shuttle replenishment from the feeler 33, and therefore the latter does not contact with the filling 35 of the shuttle with such force as to impair in any way the condition of said filling or to prevent the filling being properly fed from the shuttle during the normal operation of the loom. The spring 40 is preferably a light one and the feeling contact of the feeler with the filling 35 is at all times a light contact. The said secondary fork or feeler is pivoted as described upon a horizontal lever 43, which is itself pivoted at 44 upon the bracket 27. The pivot for the said lever 43 is provided with a coiled spring 45 which is so connected with the lever and its pivotal support that the said spring tends normally to move the outward or right hand end of the lever (viewing Figs. 3 and 4) toward the lay of the loom. The said lever 43 may be provided with an extension 46 attached to the main body of the lever by bolts 47 passing through slots in the parts, thus permitting longitudinal adjustment of said lever corresponding to the longitudinal adjustment of the bracket 27.

The opposite or left hand end of said lever 43 takes under an arm 48 pivotally connected with sufficient freedom of movement at 49 to a rock arm 50 fast upon a rock shaft 51, the latter being mounted in suitable bearings beneath the breast beam of the loom, as indicated most clearly in Fig. 1. This rock shaft extends to the opposite side of the loom where it is connected to the shuttle replenishing mechanism hereinafter described.

The left hand or inner end of the lever 43 is rounded or otherwise suitably formed, as indicated at 52 in Fig. 5, so as to take under the arm 48 and to co-act with the shoulder 53 upon the under side thereof. The outer or free end of the arm 48 is provided with a downturned end 54 which is here shown as transversely in line with the inner hooked end 21 of the weft fork 20. The pawl 22 is made sufficiently broad to engage and co-act with either or both the hooked end 21 of the filling fork 20 and the downturned end 54 of the arm 48, thereby to stop the loom upon breakage of the filling and to replenish the weft carrier or shuttle upon substantial exhaustion of the filling, and if desired also to replenish upon breakage of the filling.

The secondary fork or feeler 41 is represented as bent upwardly as shown in Figs. 6 and 7, so as to provide a shoulder 55 in advance of its pivot 42 to be engaged by the near end 56 of the feeler 33, as indicated in Fig. 6.

Upon each beat-up of the lay, the head of the filling feeler 33 enters the shuttle as indicated in Fig. 6 and contacts with the filling upon the bobbin spindle or other carrier. So long as the filling upon the carrier has not been exhausted to that predetermined extent at which shuttle replenishment is designed to occur, the filling feeler 33 is moved axially outward upon its support against the stress of the spring 40 by the said filling, and in so moving the said end 56 thereof contacts with the shoulder 55 of the secondary fork or feeler 41 and tilts the same upward into the position shown in Fig. 6. This action requires but a light engagement of the filling feeler 33 and the secondary feeler 41.

When the filling has been exhausted to a predetermined extent, as indicated in Fig. 7, then upon the next beat-up of the lay, the filling feeler 33 is no longer moved axially sufficiently to tilt the secondary fork or feeler 41, and the outer end 57 thereof engages the shuttle box to initiate or cause shuttle replenishment. This initiating action throws no strain upon the filling feeler 33, the strain being borne by the secondary feeler 41 and the shuttle binder 11.

For the engagement of the end 57 of the secondary fork or feeler to initiate the shuttle replenishing action, there is here represented as provided upon the outer wall of the binder 11 a plate 58 adjustably secured in position by bolts and nuts 59, thereby permitting the position of said plate to be accurately gaged with respect to the face of the binder. The said plate is represented as notched or grooved at 60 for the engagement of the end 57 of the secondary fork or feeler.

The weft fork slide 19 has at its rear end a downturned extension 61, against which bears a finger 62 sleeved as indicated at 63 upon the rock shaft 51. The sleeved outer or lower portions 63 of said finger are provided with a set bolt 64, whereby if desired the sleeved portion 63 of said finger 62 may be made fast upon said rock shaft 51. The said bolt 64 may, however, be sufficiently loose so that rocking movement of the finger 62 is not transmitted to the rock shaft 51, in which event weft replenishment will not occur upon weft breakage, but merely loom stoppage, for which purpose the usual dagger and co-acting parts are provided. If, however, the finger 62 be tightened upon the rock shaft 51, then weft replenishment will occur upon either substantial exhaustion or weft breakage.

So long as the filling has not been exhausted to the described predetermined extent, then, upon each beat-up of the lay, the filling feeler 33 is moved axially and tilts the secondary fork or feeler 41 as indicated in Fig. 6. When, however, the filling has been exhausted to the predetermined extent, then upon the next beat-up of the lay the filling feeler 33 remains substantially quiescent or does not rock the secondary fork or feeler 41, with the result that the end 57 of the secondary fork or feeler remains in the path of and is struck by the plate 58, and thus swings rearwardly the right hand or outer end of the lever 43 (viewing Figs. 3 and 4).

This action correspondingly moves the inner rounded end 52 of the lever 43 inward toward the lay of the loom; that is, slightly to the right of the position indicated in Fig. 5. This movement of the lever 43 carries its inner end 52 from under the shoulder 53 of the arm 48 sufficiently to let the downturned end 54 of the said arm come into the path of the swinging pawl 22. Upon the next actuation of the said pawl 22 by the weft hammer 26 of the loom, the said arm 48 is moved rearwardly or to the left, viewing Fig. 5, and hence rocks the shaft 51, and therefore initiates the movement of the weft carrier replenishing mechanism at the other side of the loom.

The pawl 22 not only co-acts with the downturned end 54 of the arm 48, thereby to replenish upon predetermined exhaustion of the filling, but the said pawl also co-acts with the hooked end 21 of the filling fork 20, which in the usual manner is tilted so long as the weft is present, but remains untilted when the weft breaks. When the weft breaks, the pawl 22 engages the said hooked end 21 of the weft fork and consequently moves the weft fork slide 19 rearwardly or toward the left viewing Fig. 5. If, now, the finger 62 be fast upon the rock shaft 51, as by tightening up the bolt 64, then it is evident that the rock shaft 51 is rocked upon breakage of the weft and that shuttle replenishment therefore occurs upon breakage of the weft. Preferably, however, for plain looms or looms working upon the cheaper grades of cloth, it is not desirable to replenish the shuttle or filling carrier upon weft breakage. It is preferable to stop the loom upon such contingency. Therefore, preferably, the finger 62 is not tightened upon the rock shaft 51 when making the cheaper grades of cloth, but if desired replenishment may occur in either contingency. If it be not desired to replenish upon weft breakage, then the usual dagger and co-acting parts are provided upon the lay in order to stop the loom upon weft breakage. This stop mechanism may be of any suitable character and associated in any suitable way with the weft hammer mechanism, but is not herein shown, as it does not of itself constitute any part of the present invention.

Shuttle replenishment preferably occurs at the side of the loom opposite that where the filling finger 33 is provided. In this form of the invention, there is, at such opposite side of the loom, provided a single shuttle box represented as provided with a back wall 65, and a binder 66 which may be spring pressed in the usual manner, as by means of a spring 67 shown in Fig. 1. The shuttle box is preferably provided with a sloping bottom 68 below the race 69 of the loom, as represented most clearly in Figs. 13 to 18 inclusive. The said shuttle box is provided with a cover 70 normally downwardly spring pressed by a coil spring 71, shown most clearly in Fig. 9. This cover 70 is pivotally mounted upon an upward extension 72 of the lay. Upon the back 65 of the shuttle box are provided a suitable number of lugs 73 having cam front faces, which when the shuttle box is raised for shuttle ejectment, rise through openings 74 in the race plate, as indicated in Fig. 9, thus crowding the running shuttle from the race plate down onto the floor or into a suitable receptacle, the sloping face 68 facilitating such discharge of the shuttle.

In order to simplify the operation and construction of the parts, the shuttle box is preferably lifted for ejectment of the shuttle and replenishment of the spare shuttle from the cam shaft 6 of the loom.

For this purpose, there is provided upon the said cam shaft 6 a replenishment or box lifting cam 75 shown most clearly in Figs. 2, 21 and 22. The cam shaft 6 turns in a clockwise direction. Upon a bracket 76 upstanding from one of the end frames 1 of the loom, there is pivoted at 77 the shuttle box lifting lever 78. To the outer end of this shuttle box lifting lever is pivoted at 79 a link 80, the lower end whereof is pivoted at 81 to a block 82 on the lower end of the shuttle box lifting rod 83, which at its upper end is connected to the under side of the shuttle box, as indicated at 84 in Fig. 1. This lifting rod 83 is guided at its upper end in the lay as indicated at 85, and adjacent its lower end it is provided with an adjustable collar 86 adapted at the limit of its downward movement to engage the upper face of the bent end 87 of the picker stick bracket 88, the said bent end 87 being provided with a suitable guiding opening for the shuttle box rod 83.

As shown most clearly in Figs. 19, 21 and 22, the hub 89 of the box lifting lever 78 is provided with an upward extension 90 upon the upper face whereof is pivoted at 91 the replenishing lever 92, the outer end 93 whereof extends below the replenishing cam 75, as indicated most clearly in Figs. 21 and 22. When the loom is operating normally, the said replenishing lever 92 is so positioned that its outer end 93 is laterally beyond the replenishing cam 75, as indicated most clearly in Fig. 19. Therefore, during the normal operation of the loom, the cam 75 does not act upon the replenishing lever 92, the latter remaining quiescent. When, however, the rock shaft 51 has been moved either by the indicating action of the weft fork or of the secondary fork or feeler 41, then the outer end 93 of the replenishing lever 92 is brought into the path of the replenishing cam 75. While this positioning of the replenishing lever 92 may be accomplished in any suitable manner, preferably for the purpose the right hand of the rock shaft 51 is provided with a crank 94 to which is pivotally connected the upper end of the upright connecting rod 95, shown most clearly in Figs. 1 and 20. The lower end of said connecting rod is pivoted at 96 to an arm 97 of a bell crank 98 pivoted at 99 upon an upwardly extending bracket 100 bolted at 101 to the side frame of the loom.

The opposite arm 102 of the said bell crank lever 98 extends upwardly in substantial parallelism with an upward extension or bracket 103 of the replenishing lever 92, as shown most clearly in Figs. 20 and 21.

When the rock shaft 51 is rocked as previously described, the connecting rod 95 is drawn upward, thereby rocking the bell crank lever 98 in a contraclockwise direction, viewing Fig. 20, and bringing the arm 102 thereof into engagement with the extension or bracket 103 of the replenishing lever 92, thereby moving the outer end 93 of the latter into the path of rotation of the replenishing cam 75. Thereupon in its further rotation, the replenishing cam 75 engages the said outer end of the replenishing lever 92 and lifts the shuttle box through the described connections to eject the running shuttle and substitute the spare shuttle therefor.

The said replenishing motion of the replenishing lever 92 is transmitted to the shuttle box lifting rod 83, by the link 80, as shown most clearly in Figs. 20 and 21. To this end, there is bolted to the lever 78 near its outer end at 105 a bracket 106 provided with a transverse slot 107 wherethrough the replenishing lever 92 passes, as indicated most clearly in said figures.

When the rock shaft 51 is rocked, the replenishing lever 92 is through the described connections slightly rotated upon its pivot 91, the said lever sliding in the slot 107 toward the left viewing Fig. 20. When the replenishing cam 75 engages the outer end 93 of the replenishing lever 92, it rocks the latter together with the box lifting lever 78 about the pivot 77 of the latter, as indicated most clearly in Figs. 21 and 22, thus lifting the shuttle box rod 83 and the shuttle box back and binder for the ejection of the running shuttle and the substitution of the spare shuttle.

The loom arch 108 or other suitable part of the framing, as represented in Fig. 2, is provided with a bracket 109 bolted thereto or otherwise rigid therewith and having suitably secured to its outer end a depending bracket 110 of general U-shape and having opposite arms 111, 112 provided with suitable bearings wherein is mounted a rock shaft 113. Upon the rock shaft 113 are mounted the spare shuttle supporting means which normally occupy an inactive position, represented in Figs. 13 and 16. In order to maintain said shuttle supporting means normally in inactive position, there is herein provided a coiled spring 114, one end whereof is fast to a collar 115, itself secured by set bolt 116 to the rock shaft 113, the opposite end of said coil spring 114 being connected to the arm 112 of the bracket 110, as indicated at 117. After the spare shuttle supporting means are moved into replenishing position as hereinafter described and the shuttle replenishment has occurred, then the coiled spring 114 returns the spare shuttle supporting means to its inactive position indicated in Figs. 13 and 16. In order to prevent the rock shaft 113 from being swung too far rearwardly or into inactive position by the action of the coil spring 114, there is provided suitable stop means herein represented as a sleeve 118 made fast by set screw 119 upon rock shaft 113 and having a stop pin 120 adapted to contact with the rear face of the bracket 110 as indicated in Fig. 9.

The outer faces of the arms 111 and 112 of the bracket 110 are provided with bosses 121 and upon the adjacent ends of the rock shaft 113 are hubs 122 made fast by set bolts or in any other suitable manner. The rearward faces of said hubs 122, as shown most clearly in Figs. 13, 14 and 15, are provided with bosses 123 having tapped or otherwise secured therein rearwardly extending pins 124, whereon are pivotally mounted spare shuttle supporting arms 125, 126, both of which are shown in Figs. 9 and 10. Each of these shuttle supporting arms 125, 126 is normally inwardly pressed by means of springs 127 coiled about the pins 124 and having one end thereof fast to the upper end of the arms 125, 126 and the other ends thereof secured to collars 128 made fast by bolts 129 to pins 124. The winding of said springs 127 is such as normally to move the lower ends of the shuttle retaining arms 125, 126 inwardly toward each other or into the position shown in Fig. 9. Near their lower ends the arms 125, 126 are provided with small recesses 130 wherein are received the ends of the spare shuttle 131, which is thus supported while the loom is running normally. In order to prevent the shuttle from turning in the supporting recesses 130, there may be provided upon one or both of the arms 125, 126, suitable co-acting means. Herein the arm 126 is represented as provided with co-acting plate springs 132 which grasp between them the sides of the shuttle 131 and retain it from rotation.

As shown most clearly in Figs. 10, 13, 14 and 15, the rock shaft 113 has fast upon one end thereof a rigid depending arm 133 which extends downwardly nearly to the upper end of the shuttle box, as indicated in Fig. 13, but just clearing the lay in its swinging movement during the normal operation of the loom. When, however, the shuttle box has been lifted as previously described, upon indication of substantial exhaustion of the filling, then the binder of the shuttle box is brought to a higher level than the lower end of said arm 133, so that upon the forward or beat-up movement of the lay, the said arm 133 is engaged by the shuttle binder 66, as indicated in Fig. 14, and the shaft 113 and parts supported thereby are rocked into the position indicated in Fig. 15. This rocking movement of the shaft 113 and parts supported thereby occurs during the forward or beat-up movement of the lay, the latter, the shuttle box and spare shuttle supporting arms all moving as one. Upon the described upward movement of the shuttle box the lugs 73 upon the inner face of the back thereof rise through the holes 74 in the race plate 69 and eject the running shuttle 134 which is shown in its running position in Fig. 13, and which is shown as ejected in Fig. 14. The arms 125, 126 are provided with lateral extensions 135 preferably beveled as indicated at 135' in Fig. 12, and which during the forward movement of said arms 125, 126 engage the lower outwardly turned ends 136 of the arms 111 and 112, thereby pressing said arms 125, 126 outwardly against the stress of their springs 127, or from each other, thereby causing them to release the spare shuttle 131.

As shown most clearly in Fig. 12, the shuttle box binder 66 at the replenishing side of the loom is pivoted at 137 to the end portion 138 of the shuttle box wall, the spring 67 bearing against the outer surface of the binder in the usual manner. In order to eject the running shuttle from the loom, it is, in this embodiment of the invention, important to the most effective operation that the shuttle binder be released or withdrawn from binding engagement with said shuttle, thus permitting the shuttle to drop or be discharged freely from the shuttle box. In order to move the binder from the running shuttle, there is preferably bolted or otherwise secured near the inner end of the shuttle box wall upon the frame of the loom a bracket 138' having an inturned end 139 terminating in or having secured thereto a cam plate 140 shown in edge view in Figs. 9 and 10 and in side elevation in Figs. 16, 17 and 18. The said cam plate being stationary, the shuttle box when lifted by the rod 83 moves upwardly past the same, as indicated in Figs. 16, 17 and 18. The shuttle binder 66 has a tip end or extension 141 extending slightly beyond the vertical plane of the cam plate 140 and normally outside the lower point 142 of the said cam plate, as indicated in Fig. 9. As the shuttle box and its binder 66 are elevated for shuttle ejection and shuttle replenishment, the said binder 66 rides along the outer edge 143 of the cam plate 140, as indicated in Fig. 17, thus withdrawing the binder from the spent shuttle and permitting the latter to be discharged from the shuttle box by the action of the lugs 73, as previously described. The construction and timing of the parts are such that when the supporting arms for the replenishing shuttle are brought into alinement with the said shuttle box and the spare shuttle is thus brought between the shuttle box back 65 and the shuttle binder 66, the latter has reached the upper point 144 of said cam plate 140 and is then permitted to be moved inwardly by the stress of its spring 67 so as to engage the spare shuttle and bind the same against the back wall of the box. In the continued movement of the parts, the shuttle box is drawn downward with its binder until the spare shuttle is brought onto the race 69 of the loom, thus making said shuttle the running shuttle and returning the parts to normal position, as indicated in Fig. 16.

The timing and construction of the parts are such that as the binder 66 is released and moves inwardly to engage the spare shuttle 131, the holding arms 125, 126 for the latter have been withdrawn as described from the tip ends of the shuttle, thus permitting the shuttle to descend readily with the descending shuttle box. In order, however, that the descent of the shuttle box may be rapid enough to withdraw the replenishing shuttle 131 below the recesses 130 of the supporting arms 125, 126 before the said arms are again thrown inwardly by the stress of their springs 127, the replenishing cam 75, as shown most clearly in Figs. 2, 21 and 22 is provided with a terminal toe 145 having an abrupt face 146 which meets the face 147 of said cam at an obtuse angle, as shown in said figures. In the rotation of said replenishing cam 75 in a clockwise direction, the outer end of the replenishing or cam lever 92 rides quickly down said abrupt face 146 of the toe 145, as indicated in dotted lines in Fig. 22. This permits a very rapid, slight, downward movement of the shuttle box sufficiently to withdraw the replenishing shuttle 131 below the recesses 130 of the said supporting arms 125, 126. The continued downward movement of the shuttle box is less abrupt owing to the contour of the face 147 of the replenishing cam 75, and the shuttle box is brought without undue jar into its lowermost position, so that the replenishing shuttle rests upon the race of the loom and becomes the running shuttle.

Immediately upon shuttle replenishing, the descent of the shuttle box from its position indicated in Figs. 14 and 15, withdraws the box below the arm 133 of the spare shuttle supporting means, and thereupon the coiled spring 114 at once rocks the spare shuttle supporting means to the left viewing Fig. 15, into the position shown in Fig. 13. Thereupon the weaver, having supplied the ejected shuttle with a filled bobbin or weft carrier, inserts the said ejected shuttle (now the spare shuttle) between the arms 125, 126, where it is supported until the next replenishing operation. Thus, it will be evident that but two shuttles are employed and that the objections incident to the use of a comparatively large number of replenishing shuttles, such as unevenness of wear, complication of parts and increased cost of operation, are obviated.

If desired, the shuttle box may be provided with any suitable protector mechanism to stop the loom in the event of improper boxing of the shuttle. For the purpose, there is herein represented in Figs. 9, 10, 16, 17 and 18 the usual protector rod 148 having fast thereon a finger 149 which normally engages the outer end of the shuttle binder, as represented most clearly in Figs. 9 and 10. In this embodiment of the invention, a filling piece 150 is represented below the binder with which the finger 149 engages when the shuttle box rises for shuttle replenishment.

It will be apparent that when the running shuttle is ejected from the loom, the weft of said shuttle extends from the selvage of the cloth outward and downward to the said ejected shuttle, unless the shuttle has been ejected upon failure of the filling. It will also be apparent that when the spare shuttle is inserted in the shuttle box, the end of its weft extends from the shuttle to some suitable point of support upon the loom frame adjacent the said replenishing box. It is therefore important to sever both these weft threads upon shuttle replenishment. For the purpose, in this embodiment of the invention, there is provided a thread parter to engage and part both of said weft threads outside of and close to the selvage of the cloth. For this purpose any suitable thread parter may be employed, but herein for the purpose there is represented in Figs. 2, 23 and 24 a thread parter, which is not specifically claimed in this application, but which is claimed in our co-pending application, Serial No. 736,286.

The said thread parter is, however, claimed in its broad aspect in combination with the co-acting devices of the shuttle replenishing mechanism.

The said thread parter is represented as a blade 151 terminating in an upwardly directed hook 152 having a sharpened weft severing inner edge. This thread parter is preferably provided with an angular slot 153, wherein is received a pin 154 laterally projecting from the supporting arm 155 of the loom temple 156 which is preferably mounted in the usual manner upon the upper surface of the breast beam as indicated at 157. The said loom temple is provided with a sheath or guiding bracket projection 158 having a depending guiding member 159, the said thread parter 151 being positioned for movement between the main portion of the bracket 158 and its guiding member 159 so as to be projected forward therefrom as indicated in full lines in Fig. 2, or to be retracted into substantially the position indicated in full lines in Fig. 24. The thread parter is preferably operated from the cam shaft 6 and the timing and operation of the parts are such that the said thread parter is projected into thread parting position only after the shuttle has been thrown from that side of the loom at which the said thread parter is mounted. The latter is projected only upon alternate beats of the lay as it is actuated from the said cam shaft 6, and therefore at those times when the shuttle is in the box at that side of the lay where the parter is mounted, the said parter is in its retracted position.

During the normal operation of the loom, therefore, the said thread parter is projected at each alternate beat of the lay when the latter is on its backward beat. At such times the weft thread does not extend beyond the selvage at that side of the loom where the thread parter is mounted, and when the weft thread is present at such side of the loom, then the thread parter is in its retracted or inactive position and cannot act upon the thread.

In order to actuate the thread parter as described, there is herein represented as fast upon the said cam shaft 6 a cam 160 (see Fig. 2) adapted to rock a lever 161 shown as having a projection 162 to rest upon said cam 160. The forward and shorter arm 163 of said lever 161 is connected by a slot and pin connection 164 with a vertical lever 165 pivoted at 166 upon a bracket 167 secured to the breast beam of the loom, as shown most clearly in Fig. 24. The said lever 165 is pivotally connected at its upper end as shown at 168 to the said thread parter 151.

Assuming that the shuttle is replenished upon substantial exhaustation of the filling and that the free or loose end of the weft in the spare shuttle is connected to some suitable bracket or portion of the loom framing, then when the running shuttle is ejected from the loom its weft extends from the guide eye of said ejected shuttle toward or to the shuttle box at that side of the loom where the thread parter is mounted. Therefore when next the thread parter 151 is projected, it encounters the said thread which now extends beyond the selvage and said thread is received in the hook 152 of the said thread parter and is drawn forward and severed. Upon the next projecting move ment of the thread parter, it encounters said free or loose end of the newly inserted shuttle which as described extends from the selvage to some suitable point of attachment on the loom frame and in a similar manner severs the same. When the thread is severed the shuttle is boxed at the opposite side.

In order to prevent the filling thread of the ejected shuttle and of the replenishing shuttle from extending below the path of operation of the thread parter, there is preferably provided a bracket or support 169 at the front of the lay adjacent the thread parter and projecting toward the same. This bracket is represented as notched or shouldered at 170 to engage the thread. The thread is received thereon, and as the lay moves forward the said thread is transferred to the hook 152 of the thread parter 151, which has been projected during the preceding backward beat of the lay and is now returning or being retracted during the forward beat of the lay. In order to insure the thread being deposited in the hooked end 152, there is preferably imparted a combined forward and downward projecting movement to the thread parter, as represented in dotted lines in Fig. 24, this movement being due to the shape of the slot 153. Upon its return movement, the thread parter moves upwardly and backwardly. It will be understood that the thread parter is projected or moved outwardly during alternate beats of the lay upon the backward beat thereof and that as the lay beats up on its next forward beat, the thread parter is retracted before the lay can come in contact with the said thread parter.

It is evident from the foregoing description that the loom and its replenishing mechanism are of simple construction, as in the described embodiment of the invention there is provided but a single shuttle box at each side of the loom. But two shuttles are employed acting alternately as the spare shuttle, and the weaver need only devote sufficient time and attention to the loom to insert a filled bobbin in the ejected shuttle. As previously stated, the loom is preferably stopped upon weft failure, so that so long as the loom is running normally and the weft does not break, the weaver can devote all the necessary time to the other looms under his charge.

It will also be apparent from the foregoing description that the shuttle replenishing mechanism can readily be applied and with a minimum amount of change and expense to existing types of looms, and particularly to those having a change shuttle box at one end thereof. Looms of such type are provided with lifting rods, such as the rod 83, and this fact has been availed of in the construction of the replenishing mechanism. In the usual type of loom, there is provided a shuttle box lifting cam upon the cam shaft. In the disclosed embodiment of the present invention such cam has been omitted and in its place has been substituted the replenishing cam 75.

Having thus described one illustrative embodiment of the invention, it is to be understood that although specific terms are employed, they are used in a generic and descriptive sense and not for purposes of limitation, the scope of the invention being set forth in the following claims.

Claims:

1. Shuttle replenishing mechanism for looms comprising in combination, a lay, a running shuttle-box movable therewith, a member mounted upon the loom frame and adapted to support a spare shuttle, means to elevate the front and back walls of the running shuttle-box away from the bottom wall thereof into inactive position, and means to transfer said spare shuttle from said supporting member to said inactively positioned front and back shuttle box walls.

2. Shuttle replenishing mechanism for looms comprising in combination, a lay, a running shuttle-box movable therewith, a member mounted upon the loom frame and adapted to support a spare shuttle, means to move the front and back walls of the running shuttle box into inactive position away from the bottom wall thereof, means to transfer said spare shuttle from said supporting member to said inactively positioned front and back shuttle box wall and to effect binding of said shuttle by said walls when inactively positioned, and means to return said walls to active position.

3. Shuttle replenishing mechanism for looms comprising in combination a lay, a running shuttle-box movable therewith, a supporting member for a spare shuttle, means to move the front and back walls of the running shuttle-box into inactive position away from the bottom wall thereof and to effect ejection of the spent shuttle through one of said walls, and means to transfer said spare shuttle from said supporting member to said inactively positioned front and back shuttle-box walls.

4. Shuttle replenishing mechanism for looms comprising in combination, a lay, a running shuttle-box movable therewith, a supporting member for a spare shuttle having means to grasp with pressure said spare shuttle by its tips, means to move said shuttle-box into inactive position, and means to release said spare shuttle from said grasping means of the supporting member directly into said inactively positioned shuttle box.

5. Shuttle replenishing mechanism for looms comprising in combination a lay, a running shuttle-box movable therewith, a supporting member for a spare shuttle, means to move opposed lateral walls of said shuttle box into inactive position, means to transfer said spare shuttle from said supporting member to said inactive positioned walls of the shuttle box and to effect binding of the spare shuttle by said inactively positioned walls, and means to return said shuttle-box to active position.

6. Shuttle replenishing mechanism for looms comprising in combination, a lay, a running shuttle-box movable therewith, a supporting member for a spare shuttle, means to elevate the shuttle-box back and binder from the shuttle race, means to insert the spare shuttle from the supporting member, between said back and binder while they are elevated from the shuttle race and means for effecting binding of the inserted spare shuttle by said binder and back while elevated.

7. Shuttle replenishing mechanism for looms comprising in combination, a lay, a running shuttle-box movable therewith, a supporting member for a spare shuttle, means to elevate the shuttle-box back and binder from the shuttle box bottom, means to move the binder outwardly and to effect its return inward movement, and means to insert the spare shuttle, from the supporting member, between said back and binder while they are elevated from the shuttle box bottom.

8. Shuttle replenishing mechanism for looms comprising in combination, a lay, a running shuttle-box movable therewith, a supporting member for a spare shuttle, means to eject the running shuttle from said running box toward the front of the loom and means to cause said shuttle box actively to withdraw the spare shuttle from said supporting member.

9. Shuttle replenishing mechanism for looms comprising in combination, a lay, a running shuttle-box movable therewith, a supporting member for a spare shuttle, means to elevate a shuttle binding portion of said shuttle-box away from the said box bottom and to return it, and means to transfer the spare shuttle from its support to the said shuttle binding portion while the latter is elevated.

10. Shuttle replenishing mechanism for looms comprising in combination, a lay, a running shuttle-box movable therewith, a supporting member for a spare shuttle, means to elevate the front and back of the shuttle-box from the lay into position to receive the spare shuttle, means to eject the old shuttle from the box as the front and back of the latter are elevated, and means to effect movement of the spare shuttle from its support downwardly between said elevated front and back of the shuttle box.

11. Shuttle replenishing mechanism for looms comprising in combination, a lay, a running shuttle-box movable therewith, a supporting member for a spare shuttle, conjoint means to elevate the front and back of the shuttle-box from the bottom thereof to receive the spare shuttle and to eject the old shuttle, and means to transfer the spare shuttle from its support to the box.

12. Shuttle replenishing mechanism for looms comprising in combination, a lay, a running shuttle-box movable therewith and having a shuttle grasping portion movable away from the shuttle box bottom into shuttle grasping position, a supporting member for a spare shuttle, means to indicate the substantial exhaustion of filling upon a forward beat of the lay, and means to effect the ejection of the exhausted shuttle and the transfer of the spare shuttle to said shuttle grasping portion, upon the next forward beat of the lay.

13. Shuttle replenishing mechanism for looms comprising in combination, a lay, a running shuttle-box movable therewith, a supporting member for a spare shuttle, means to elevate the front and back of said box away from the bottom thereof, means to indicate the substantial exhaustion of filling upon a forward beat of the lay, and means to effect the transfer of the spare shuttle from said support to said elevated front and back box walls, upon the next forward beat of the lay.

14. Shuttle replenishing mechanism for looms comprising in combination, a lay, a running shuttle-box movable therewith, a spare shuttle support depending from a portion of the loom frame and having means to grasp the spare shuttle by its tips, and means to effect the transfer of the spare shuttle from said depending support to the running shuttle-box, said means including means to elevate the back and front walls of the said shuttle box away from the bottom thereof.

15. Shuttle replenishing mechanism for looms comprising in combination a lay, a running shuttle-box movable therewith, means to grasp a spare shuttle frictionally with pressure by its tips, and means to effect the transfer of the spare shuttle from said grasping means to the running shuttle-box, said means including means to elevate a shuttle grasping portion of said shuttle box.

16. Shuttle replenishing mechanism for looms comprising in combination a lay, a running shuttle-box movable therewith, a member rigid with the loom frame at a higher elevation than the normally positioned shuttle-box and having a spare shuttle support, and means to effect the transfer of the spare shuttle from said support to said running shuttle-box, said means including means to elevate the front and back walls of the said shuttle box away from the bottom thereof and to eject the running shuttle through said front wall.

17. Shuttle replenishing mechanism for looms comprising in combination a lay, a running shuttle-box movable therewith, means to support a spare shuttle by engagement with the ends thereof, and means to transfer the spare shuttle from said supporting means to the running shuttle-box, said means including running shuttle ejecting means mounted for upward movement through the bottom of said box.

18. Shuttle replenishing mechanism for looms comprising in combination a lay, a running shuttle-box movable therewith, supporting arms to engage the ends of a spare shuttle, and means to effect the transfer of the spare shuttle from said supporting arms to the running shuttle-box, said means including means to move to said shuttle supporting arms a shuttle grasping portion of said box, whereby said shuttle grasping portion of the box takes the shuttle from said supporting arms.

19. Shuttle replenishing mechanism for looms comprising in combination a lay, a running shuttle-box movable therewith, spring means to grasp a spare shuttle by the tips, and means to transfer said spare shuttle from said spring means to the running shuttle-box, said transfer means including a movable shuttle grasping portion of said running shuttle box.

20. Shuttle replenishing mechanism for looms comprising in combination a lay, a running shuttle-box movable therewith, spare shuttle-supporting means pivoted at an elevation higher than the normally positioned shuttle-box and constructed and arranged to grasp the shuttle by the tips thereof and having movement toward and from the lay, and means to effect transfer of the spare shuttle from said supporting means to the running shuttle-box, said transfer means including means to move a shuttle grasping portion of said running shuttle box toward said spare shuttle supporting means.

21. Shuttle replenishing mechanism for looms comprising in combination a lay, a running shuttle-box movable therewith, spare shuttle-supporting means pivoted at an elevation higher than the normally positioned shuttle-box and having movement toward and from the lay, and means to bring said supporting means into vertical alinement with the running shuttle-box and thereupon to transfer the spare shuttle to the said shuttle-box, said transfer means including means to elevate the front and back walls of the movable shuttle box away from the bottom thereof, to engage the shuttle.

22. Shuttle replenishing mechanism for looms comprising in combination a lay, a running shuttle-box movable therewith, means to support a spare shuttle, and means to cause the shuttle box directly to grasp a spare shuttle from its support.

23. Shuttle replenishing mechanism for looms comprising in combination, a lay, a running shuttle-box movable to impart a running-spare-shuttle-grasping movement to the binder of said box, means to grasp a spare shuttle by its tips and thereby support the same, and means to effect transfer of said spare shuttle from said grasping means to the shuttle-box.

24. Shuttle replenishing mechanism for looms comprising in combination, a lay, a running shuttle-box movable therewith, arms pivoted at an elevation higher than the normally positioned shuttle-box, to support a spare shuttle, and means to transfer the spare shuttle from said supporting arms to said box, said transfer means including means to elevate the front and back walls of the shuttle box away from the bottom thereof and to eject the spent shuttle off said bottom toward the front of the loom.

25. Shuttle replenishing mechanism for looms comprising in combination a lay, a running shuttle-box movable therewith, a spare shuttle holder supported at an elevation higher than the normally positioned shuttle-box, and means to effect the transfer of the spare shuttle from said supporting means to said box, said means including spent shuttle ejecting means having an up and down movement through the bottom of said shuttle box.

26. Shuttle replenishing mechanism for looms comprising in combination, means to support a spare shuttle, a lay, a running shuttle-box movable therewith, and having a back and a binder, and means to move said binder outwardly and to elevate said outwardly moved binder and the shuttle box-back, to permit the ejection of the running shuttle upon filling fault and to grasp said spare shuttle from its support and to effect the return inward movement of the binder.

27. Shuttle replenishing mechanism for looms comprising in combination, means to support a spare shuttle, a lay, a running shuttle-box movable therewith, and having a back and a binder, and means to move said binder outwardly, and to move said outwardly moved binder and the shuttle-box-back away from the shuttle race, to permit the ejection of the running shuttle upon filling fault and to effect the return inward movement of the binder.

28. Shuttle replenishing mechanism for looms comprising in combination, means to support a spare shuttle, a lay, a running shuttle-box movable therewith, and having a back and a binder, means to move said binder outwardly, and to move said outwardly moved binder and the shuttle box-back away from the shuttle race, to permit the ejection of the running shuttle and to effect the return inward movement of the binder, and means to effect the transfer of said spare shuttle to said binder and box-back upon filling fault, by the grasping of said spare shuttle by said back and binder.

29. Shuttle replenishing mechanism for looms comprising in combination, a lay, a running shuttle-box movable therewith, and having a back and a binder, means to move said binder outwardly, and to move said outwardly moved binder and the shuttle box-back away from the shuttle race, to permit the ejection of the running shuttle, means to present a replenishing shuttle to said box-back and outwardly moved binder and means for effecting the gripping of the replenishing shuttle between said box-back and shuttle binder.

30. Shuttle replenishing mechanism for looms comprising in combination, a lay, a running shuttle-box movable therewith, and having a back and a binder, means to move said binder outwardly, and to move said outwardly moved binder and the shuttle box-back away from the shuttle race, to permit the ejection of the running shuttle, means to present a replenishing shuttle to said box-back and outwardly moved binder, means for effecting the gripping of the replenishing shuttle between said box-back and shuttle binder, and means to move the gripped shuttle onto the race of the lay.

31. Shuttle replenishing mechanism for looms comprising in combination a lay, a running shuttle-box movable therewith, means to support a spare shuttle, means acting through upward movement of the shuttle box to grip said spare shuttle when out of operative running position and supported as a spare shuttle, and means to bring said gripped shuttle onto the bottom of said box.

32. Shuttle replenishing mechanism for looms comprising in combination, a lay, a running shuttle-box movable therewith, means to support a spare shuttle, means to move the box binder away from the bottom of said box and into non-binding position, means to present a replenishing shuttle at the inner face of said binder, and means coöperating with the binder and whereby said binder grips the replenishing shuttle and moves it onto the bottom of said box.

33. Shuttle replenishing mechanism for looms comprising in combination, a lay, a running shuttle-box movable therewith, and means movable upwardly through the bottom of the said box to eject the shuttle therefrom upon filling fault, and means to move a spare shuttle downwardly onto the bottom of the box.

34. Shuttle replenishing mechanism for looms comprising in combination, a lay, a running shuttle-box movable therewith, means movable upwardly through the bottom of the said box to eject the shuttle therefrom toward the front of the loom, upon substantial exhaustion of the filling, and means to grasp a spare shuttle above the race of the lay and to move it into the box.

35. Shuttle replenishing mechanism for looms comprising in combination, a lay, a running shuttle-box movable therewith, a spare shuttle holder, means to transfer said spare shuttle downwardly from said holder onto the race of the lay, and means acting through the bottom of the said shuttle box to eject the spent shuttle from the loom.

36. Shuttle replenishing mechanism for looms comprising in combination, a lay, a running shuttle-box movable therewith, a spare shuttle holder supported upon the loom frame and having movement toward and from the lay, means to transfer said spare shuttle downwardly from said holder onto the race of the lay, and means movable through the bottom of the box to eject the spent shuttle.

37. Shuttle replenishing mechanism for looms comprising in combination, a lay, a running shuttle-box movable therewith, and means to move said shuttle-box in a substantially right line for the ejection of a shuttle therefrom and to effect the gripping of a spare shuttle by said box, upon predetermined, substantial exhaustion of the filling of the running shuttle.

38. Shuttle replenishing mechanism for looms comprising in combination, a lay, a running shuttle-box movable therewith, a replenishing shuttle support above the normal position of said shuttle box, weft fork mechanism, means to indicate substantial exhaustion of the filling, means acting upon such indication, through the weft fork mechanism, to transfer the replenishing shuttle downwardly from said support to the said shuttle-box, and means acting through the bottom of the shuttle box to eject the spent shuttle.

39. Shuttle replenishing mechanism for looms comprising in combination a lay, a running shuttle-box movable therewith, a replenishing shuttle support, weft fork mechanism, means to indicate substantial exhaustion of the filling, and means initiated in action by such indication, and operating through the weft fork mechanism, to eject the running shuttle from said box and to transfer said replenishing shuttle to said box, said transferring means including means to bind the spare shuttle and to draw it by said binding means into operative position in said box.

40. Shuttle replenishing mechanism for looms comprising in combination a lay, a running shuttle-box movable therewith, a replenishing shuttle support, weft fork mechanism, means to indicate substantial exhaustion of the filling, and means initiated in action by such indication, and operating through the weft fork mechanism, to elevate the shuttle box back and binder from the race of the lay, to engage a replenishing shuttle by said back and binder while elevated, and to return said parts to normal position with said replenishing shuttle engaged thereby.

41. Shuttle replenishing mechanism for looms comprising in combination a lay, a running shuttle-box movable therewith, a replenishing shuttle support, weft fork mechanism, means to indicate substantial exhaustion of the filling, and means initiated in action by such indication, and operating through the weft fork mechanism to eject the running shuttle from said box, to grip a replenishing shuttle, and to move it by the gripping means onto the race of the lay.

42. Shuttle replenishing mechanism for looms comprising in combination a lay, a running shuttle-box movable therewith, a replenishing shuttle support, weft fork mechanism, means to indicate substantial exhaustion of the filling, and means initiated in action by such indication and operating through the weft fork mechanism to eject the running shuttle from said box, to grip a replenishing shuttle above the race of the lay, and to move said gripped shuttle down onto the race of the lay.

43. Shuttle replenishing mechanism for looms comprising in combination, a lay, a running shuttle-box movable therewith, a supporting member for a spare shuttle, means to elevate the front and back of the shuttle-box from the lay, means to eject the old shuttle from the box as the front and back of the latter are elevated, and means to effect binding of said spare shuttle by said front and back while elevated.

44. Shuttle replenishing mechanism for looms comprising in combination, a lay, a running shuttle-box movable therewith, a supporting member for a spare shuttle, means to elevate the front and back of the shuttle-box from the lay, means to eject the old shuttle from the box as the front and back of the latter are elevated, and means to effect withdrawal of said spare shuttle from said supporting member by said front and back.

45. Shuttle replenishing mechanism for looms comprising in combination, a lay, a running shuttle-box movable therewith, a supporting member for a spare shuttle, means to elevate the front and back of the shuttle-box from the lay and to spread apart said front and back for the reception of the spare shuttle, and means to eject the old shuttle from the box as the front and back of the latter are elevated.

46. Shuttle replenishing mechanism for looms comprising in combination, a lay, a running shuttle-box movable therewith, a supporting member for a spare shuttle, means to indicate the substantial exhaustion of filling upon a forward beat of the lay, and means to effect the grasping of the spare shuttle by the said shuttle box from said supporting member upon the next forward beat of the lay.

47. Shuttle replenishing mechanism for looms comprising in combination, a lay, a running shuttle-box movable therewith, a supporting member for a spare shuttle, means to elevate the front and back of said box from the lay by a right line movement, means to indicate the substantial exhaustion of filling upon a forward beat of the lay, and means to effect the grasping of the spare shuttle from said support by said elevated front and back box walls, upon the next forward beat of the lay.

48. Shuttle replenishing mechanism for looms comprising in combination, a lay, a running shuttle-box movable therewith, a spare shuttle support depending from a portion of the loom frame, and means to effect the transfer of the spare shuttle from said depending support to the running shuttle-box, said means including running-shuttle-ejecting means to eject the spent shuttle from said movable shuttle box and also including means to grasp the spare shuttle from said support.

49. Shuttle replenishing mechanism for looms comprising in combination, a lay, a spare shuttle support above the lay, a running shuttle-box movable therewith, and means movable upwardly through the bottom of the said box to eject the shuttle therefrom upon filling fault, and means to supply a spare shuttle to the said box from said spare shuttle support.

50. Shuttle replenishing mechanism for looms comprising in combination, a lay, a running shuttle-box movable therewith, and means movable upwardly through the bottom of the said box to eject the shuttle therefrom upon filling fault, and means to support a spare shuttle above said box and to supply it to said box upon replenishment indication.

51. Shuttle replenishing mechanism for looms comprising in combination, a lay, a running shuttle-box movable therewith, means movable upwardly through the bottom of the said box to eject the shuttle therefrom toward the front of the loom, upon substantial exhaustion of the filling, means to support a spare shuttle above said box, and means to elevate said box to receive said spare shuttle.

52. Shuttle replenishing mechanism for looms comprising in combination, a lay, a running shuttle-box movable therewith, a replenishing shuttle support, weft fork mechanism, means to indicate substantial exhaustion of the filling, and means initiated in action by such indication, and operating through the weft fork mechanism, to eject the running shuttle from said box and to transfer said replenishing shuttle to said box, said transferring means including a movable back box wall and binder to grasp the spare shuttle and to move it into picking position.

53. Shuttle replenishing mechanism for looms comprising in combination, a lay, a running shuttle-box movable therewith, a replenishing shuttle support, weft fork mechanism, means to indicate substantial exhaustion of the filling, and means initiated in action by said indication, and operating through the weft fork mechanism and movable upwardly through the bottom of said shuttle box, to eject the running shuttle from said box and to transfer said replenishing shuttle to said box.

54. Shuttle replenishing mechanism for looms comprising in combination, a lay, a running shuttle box movable therewith, replenishing shuttle supporting means, and means to elevate a shuttle grasping portion of said box away from the bottom thereof and to move it into grasping relation to a shuttle supported by said shuttle supporting means thereby to effect shuttle replenishment.

55. Shuttle replenishing mechanism for looms comprising in combination, a lay, a running shuttle box movable therewith, replenishment-shuttle-supporting means, and means to move a shuttle grasping portion of said box away from the bottom thereof, into grasping relation to a shuttle supported by said shuttle supporting means, thereby to effect shuttle replenishment by said grasping of the replenishment shuttle from said supporting means.

56. Shuttle replenishing mechanism for looms comprising in combination, a lay, a running shuttle box movable therewith, spring means to support a spare shuttle, and means to cause the said shuttle box to grasp and draw a spare shuttle from said means.

57. Shuttle replenishing mechanism for looms comprising in combination, a lay, a running shuttle box movable therewith and having opposed portions movable away from the bottom thereof, means to support a spare shuttle, and means co-acting with said opposed portions of the shuttle box to effect the gripping of the spare shuttle when out of operative running position and supported as a spare shuttle and to bring said gripped shuttle onto the bottom of said box.

58. Shuttle replenishing mechanism for looms comprising in combination, a lay, a running shuttle box movable therewith, means to support a spare shuttle, and means to cause said shuttle box to grasp and draw a spare shuttle from said means.

59. Shuttle replenishing mechanism for looms comprising in combination, a lay, a running shuttle box movable therewith, a replenishing shuttle support, weft fork mechanism, means to indicate substantial exhaustion of the filling, and means initiated in action by such indication and operating through the weft fork mechanism to eject the running shuttle from said box to grip a replenishing shuttle by opposing walls of the box and to move it onto the race of the lay.

60. Shuttle replenishing mechanism for looms comprising in combination, a lay, a running shuttle box movable therewith, a supporting member for a spare shuttle and by which the same is grasped by its ends, means to indicate the substantial exhaustion of the filling upon the forward beat of the lay, and means to effect the drawing of the spare shuttle from its grasped position by right line movement of said running shuttle box upon the next forward beat of the lay.

61. Shuttle replenishing mechanism for looms comprising in combination, a lay, a running shuttle box movable therewith, a supporting member for a spare shuttle, means to indicate the substantial exhaustion of filling upon the forward beat of the lay, and means to effect the transfer of the spare shuttle to the shuttle box through upward grasping movement of the shuttle box upon the next forward beat of the lay.

62. Shuttle replenishing mechanism for looms comprising in combination, a lay, a running shuttle box movable therewith, spring means to grasp a spare shuttle by the tips, means to transfer said spare shuttle from said spring means to the running shuttle box, said transfer means including a shuttle grasping portion of said running shuttle box constructed and arranged to take the shuttle directly from said spring means.

63. Shuttle replenishing mechanism for looms comprising in combination, means to support a spare shuttle, a lay, a running shuttle box movable therewith and having a back and a binder, means to move said binder outwardly and to elevate said binder upwardly and to elevate said upwardly moved binder and the shuttle box back, thereby to grasp said spare shuttle from its support, and means to effect return inward movement of the binder.

64. Shuttle replenishing mechanism for looms comprising in combination, a lay, a running shuttle box movable therewith, a member constituting a part of the loom and supporting with pressure a spare shuttle, means to indicate the substantial exhaustion of filling upon the forward beat of the lay, and means to effect the transfer of the spare shuttle to the shuttle box by the pulling of the spare shuttle from its supporting member.

65. Shuttle replenishing mechanism for looms comprising in combination, a lay, a running shuttle box movable therewith, a supporting member for a spare shuttle, means to indicate the substantial exhaustion of filling upon the forward beat of the lay, and means to effect the transfer of the spare shuttle to the shuttle box by the pulling action of the shuttle box upon the spare shuttle, whereby said spare shuttle is pulled away from its said supporting member.

In testimony whereof, we have signed our names to this specification, in the presence of two subscribing witnesses.

EDWARD A. CUNNIFF.
JOHN V. CUNNIFF.

Witnesses:
HENRY P. NICKERSON,
IRVING U. TOWNSEND.